(12) United States Patent
Yokota et al.

(10) Patent No.: US 9,221,581 B2
(45) Date of Patent: Dec. 29, 2015

(54) CUP HOLDER

(71) Applicant: TOYODA GOSEI CO., LTD., Kiyosu-shi, Aichi-ken (JP)

(72) Inventors: Nobuhiko Yokota, Kiyosu (JP); Hitoshi Fujisawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/560,103

(22) Filed: Dec. 4, 2014

(65) Prior Publication Data

US 2015/0201780 A1 Jul. 23, 2015

(30) Foreign Application Priority Data

Jan. 21, 2014 (JP) ................................. 2014-008516

(51) Int. Cl.
*A47K 1/08* (2006.01)
*B65D 21/08* (2006.01)
*B60N 3/10* (2006.01)

(52) U.S. Cl.
CPC . *B65D 21/08* (2013.01); *B60N 3/10* (2013.01)

(58) Field of Classification Search
CPC .......................... A47G 23/0216; B65D 21/08
USPC ............... 248/311.2; 224/282, 483, 542, 926; 296/37.5
See application file for complete search history.

(56) References Cited

U.S. PATENT DOCUMENTS

| | | | |
|---|---|---|---|
| 4,759,584 A * | 7/1988 | Dykstra et al. | 297/188.16 |
| 5,634,621 A * | 6/1997 | Jankovic | 248/311.2 |
| 7,350,757 B2 * | 4/2008 | Baek | 248/311.2 |
| 7,694,928 B2 * | 4/2010 | Lee et al. | 248/311.2 |
| 7,757,888 B2 * | 7/2010 | Ogura | 220/737 |
| 2005/0269472 A1 * | 12/2005 | Wagner et al. | 248/311.2 |

FOREIGN PATENT DOCUMENTS

| | | |
|---|---|---|
| JP | 2002-362212 A | 12/2002 |
| JP | 2003-48472 A | 2/2003 |
| JP | 2007-196884 A | 8/2007 |
| JP | 2010-215073 A | 9/2010 |

* cited by examiner

*Primary Examiner* — Gwendolyn Baxter
(74) *Attorney, Agent, or Firm* — Posz Law Group, PLC

(57) ABSTRACT

A cup holder has a height adjuster that includes a lock member turnably held by the tray, a guide groove that is formed on a sidewall of the holder body and that enables the lock member to move in a perpendicular direction, a lower latch recessed portion and an upper latch recessed portion that are formed on a groove side surface which faces the guide groove on the sidewall and that cause the tray to be held at a lower position or an upper position by latching the lock member, a latch energizing member that energizes the lock member to a latch direction for latching the lock member with the lower latch recessed portion or the upper latch recessed portion, an operation member that cancels latch of the lock member with the lower latch recessed portion when the tray is located at the lower position, and a movement energizing member that energizes the tray upward.

10 Claims, 10 Drawing Sheets

CUP HOLDER

BACKGROUND OF THE INVENTION

1. Field of the Invention

The present invention relates to a cup holder in which a tray that holds a bottom part of a beverage container can be moved vertically.

2. Description of the Related Art

A cup holder is loaded in a vehicle interior of a vehicle. The cup holder accommodates a beverage container of various heights. The cup holder is designed to cause the bottom part of the beverage container to be vertically moved according to the height of the beverage container.

For example, in Japanese Unexamined Patent Publication No. 2010-215073, it is disclosed that, by providing a spring on the bottom plate, the bottom plate is vertically moved according to the load of the cup. In Japanese Unexamined Patent Publication No. 2007-196884, it is disclosed that, by inserting a screw shaft into a screw hole in the bottom plate, the screw shaft is rotated according to a moving amount of an operation member, and the bottom plate is vertically moved. In Japanese Unexamined Patent Publication No. 2003-48472, it is disclosed that a sidewall part has many latch claws whose recessed portions or protruded portions have substantially sawtooth shapes in a vertical cross section, and a latch piece that is formed on a bottom receiving part is detachably latched with a latch claw at an arbitrary height. In Japanese Unexamined Patent Publication No. 2002-362212, it is disclosed that a lock claw that is formed on the tray is detachable with any of two lock grooves that have different heights on the holder body.

SUMMARY OF THE INVENTION

As described above, there have been various mechanisms for adjusting the height of the tray of the cup holder. The inventor has developed a cup holder that can adjust the height of the tray by a new configuration.

The present invention has been made in view of the above situation, and an object of the invention is to provide a cup holder that can adjust the height of the tray.

(1) A cup holder according to the present invention includes a cylindrical holder body that has an accommodation space surrounded by a sidewall, a tray that is accommodated in the accommodation space and is held to be vertically movable between a first position and a second position whose perpendicular direction is different from that of the first position, and a height adjuster that causes the tray to be vertically moved and held at the first position or the second position. The height adjuster includes a lock member that is turnably held by the tray, a guide groove that is formed on a sidewall of the holder body and that enables the lock member to move in a perpendicular direction, a first latch recessed portion that is formed on a groove side surface which faces the guide groove on the sidewall of the holder body and that causes the tray to be held at the first position by latching the lock member, a second latch recessed portion which is formed at a portion of the groove side surface of the holder body and whose position in a perpendicular direction is different from that of the first latch recessed portion and which causes the tray to be held at the second position by latching the lock member, a latch energizing member that energizes the lock member to a latch direction for latching the lock member with the first latch recessed portion or the second latch recessed portion, an operation member that cancels latch of the lock member with the first latch recessed portion by causing the lock member to turn to a cancellation direction opposite to the latch direction when the tray is located at the first position, and a movement energizing member that energizes the tray from the first position toward the second position so as to vertically move the lock member of which latch with the first latch recessed portion has been canceled toward the second latch recessed portion through the guide groove.

The cup holder of the above configuration has the tray that is provided in the accommodation space of the holder body, and the height adjuster that adjusts the height of the tray. The lock member of the height adjuster is turnably provided on the tray, and the lock member also moves vertically following a vertical movement of the tray. The lock member is energized, by the latch energizing member, to the latch direction to be latched with the first latch recessed portion or the second latch recessed portion. While the lock member is being latched with the first latch recessed portion, the tray is being held at the first position. While the lock member is being latched with the second latch recessed portion, the tray is being held at the second position.

When the latch of the lock member with the first latch recessed portion is canceled by the operation member while the tray is being held at the first position, the tray is moved from the first position to the second position by the movement energizing member. Following this movement, the lock member that is provided on the tray moves toward the second latch recessed portion while being guided by the guide groove, and is latched with the second latch recessed portion. The tray is held at the second position.

When the latch of the lock member with the second latch recessed portion is canceled and also when load is applied to the direction from the second position to the first position while the tray is being held at the second position, the tray is moved from the second position to the first position. Following this movement, the lock member that is provided on the tray moves downward by being guided by the guide groove, and is latched with the first latch recessed portion. The tray is held at the first position.

As described above, according to the present invention, when the lock member is turned to the cancellation direction of canceling the latch with the first latch recessed portion by operating the operation member, the tray becomes able to be moved vertically, and the tray can be moved from the first position to the second position.
The height of the tray can be adjusted by a simple configuration.

(2) Preferably, the operation member has a tapered portion that causes the lock member to turn to the cancellation direction when the operation member is operated. By operating the operation member, the tapered portion of the operation member causes the lock member to turn to the cancellation direction, and the latch of the lock member can be smoothly canceled.

(3) Preferably, the lock member has a protruded portion that is extended to an outer side in the radial direction, and the protruded portion holds the tray at the first position or the second position by being latched with the first latch recessed portion or the second latch recessed portion.

The protruded portion of the lock member is securely latched with the first latch recessed portion or the second latch recessed portion. The tray can be securely held at the first position or the second position.

(4) Preferably, the lock member has a plurality of the protruded portions laid out in the circumferential direction, and on the sidewall of the holder body, the guide groove, the first latch recessed portion, and the second latch recessed portion are respectively formed at positions opposite to the protruded portions.

When the plurality of protruded portions is laid out in the circumferential direction of the lock member, and when each protruded portion is latched with the first latch recessed portion or the second latch recessed portion, the tray can be stably held in the first latch recessed portion or second latch recessed portion in the holder body.

(5) Preferably, the lock member has an inclined portion that is brought into contact with the opening peripheral edge of the second latch recessed portion. With the inclined portion formed on the lock member, and by latching the inclined portion with the opening peripheral edge of the second latch recessed portion, when pressing load is applied to the tray, the latch of the lock member with the second latch recessed portion is canceled by detaching the lock member from the second latch recessed portion by using component force of the pressing load along the inclined portion. When the tray is further pressed in this state, the tray can be moved from the second position to the first position. Due to the simple configuration, the latch of the lock member with the second latch recessed portion can be canceled.

According to the cup holder of the present invention, when the latch of the lock member with the first latch recessed portion is canceled by operating the operation member, the lock member is vertically moved toward the second latch recessed portion along the guide groove. Therefore, the height of the tray can be adjusted.

DETAILED DESCRIPTION OF THE PREFERRED EMBODIMENTS

First Embodiment

A cup holder according to a first embodiment of the present invention will be described in detail with reference to the drawings.

Figure 1:
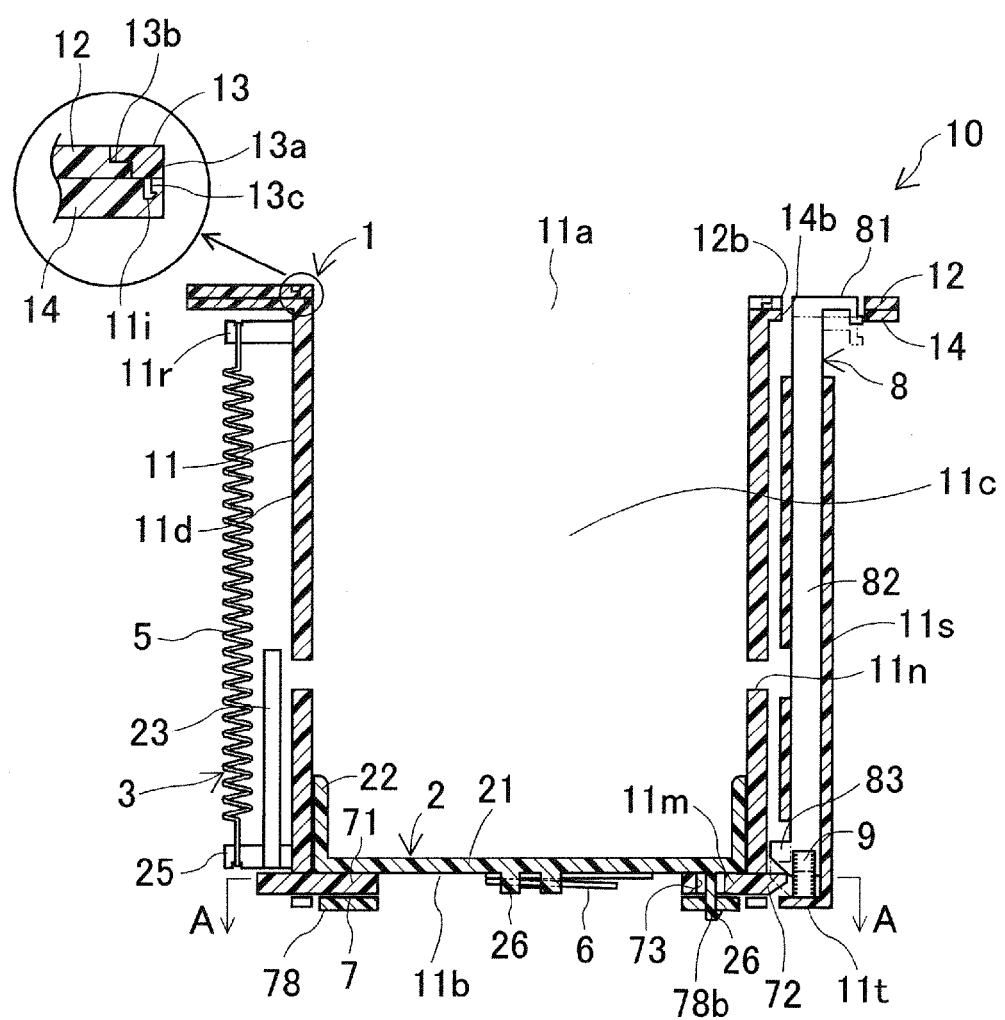
FIG. 1 is a sectional view of a cup holder when a tray is located at a lower position, according to a first embodiment of the present invention.
Figure 2:
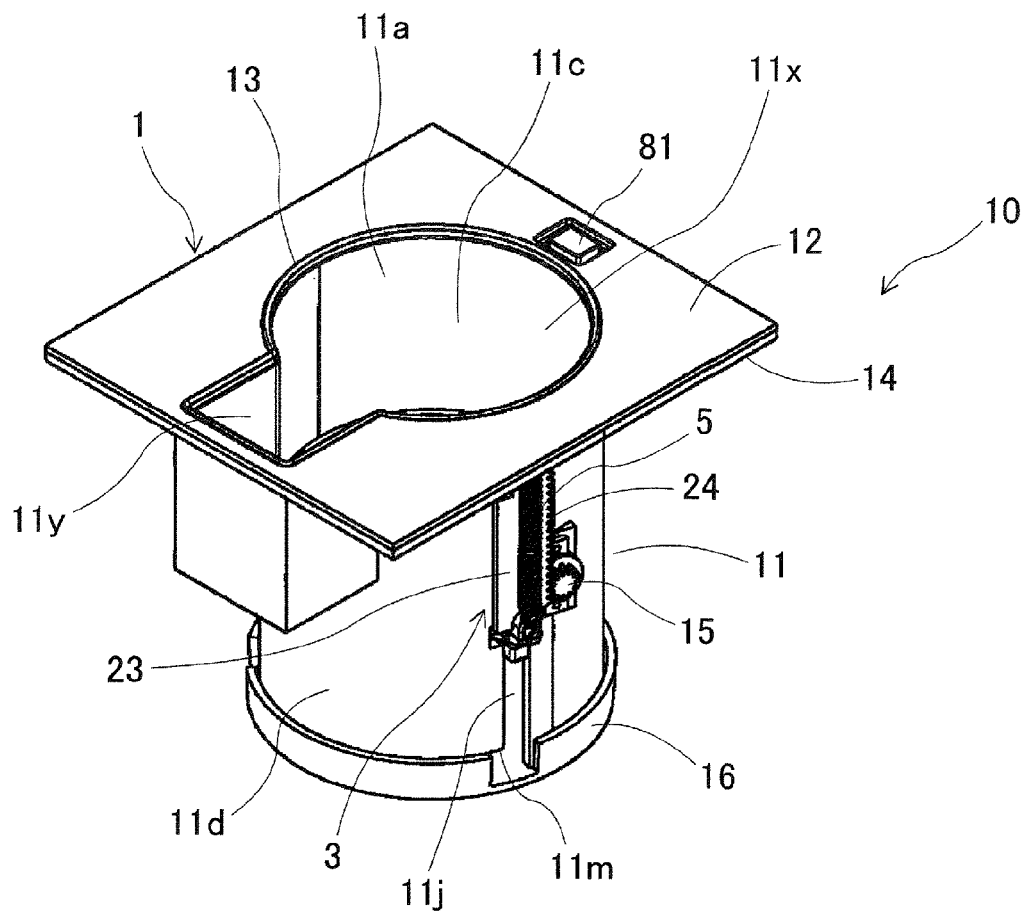
FIG. 2 is a perspective view of the cup holder, according to the first embodiment.

As shown in FIGS. 1 and 2, a cup holder 10 has a holder body 1, a tray 2, and a height adjuster 3 that adjusts the height of the tray 2 and holds the tray 2 at a lower position (a first position) or an upper position (a second position). The holder body 1 has a body part 11 of a cylindrical shape, an upper plate 12 that is fixed to an upper side of the body part 11, and a ring member 13.

Figure 3:
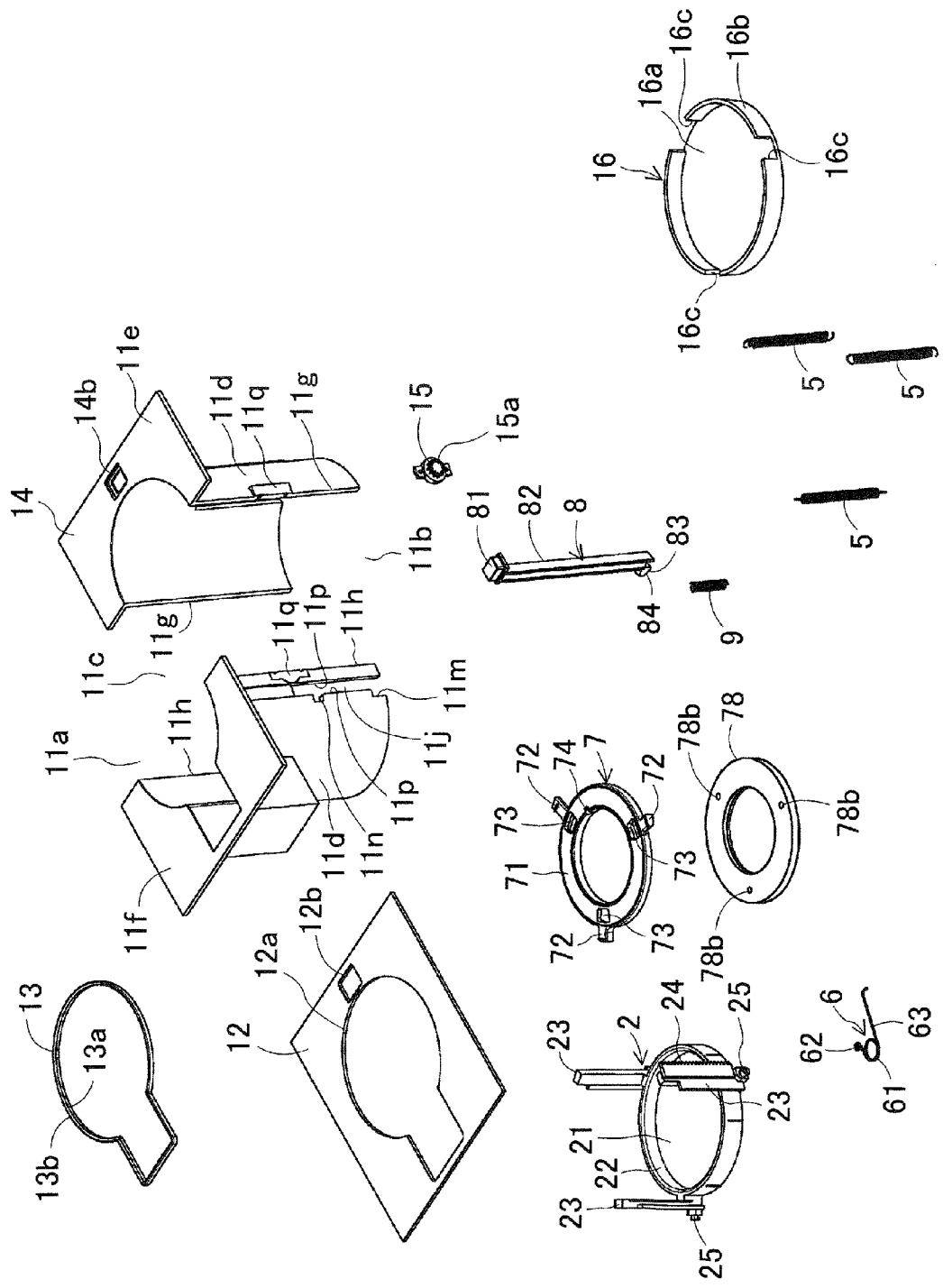
FIG. 3 is an exploded perspective view of the cup holder, according to the first embodiment.

The body part 11 has openings 11a and 11b at both sides in an axial direction (a perpendicular direction), and a flange portion 14 is formed at a peripheral edge of the opening 11a at the upper side. An accommodation space 11c is formed inside the body part 11. The accommodation space 11c is surrounded by a sidewall 11d that encircles the accommodation space 11c of the body part 11. As shown in FIG. 3, the body part 11 includes a first member 11e and a second member 11f that are formed by dividing the sidewall 11d into two portions along the axial direction. The first member 11e and the second member 11f have joining portions 11g and 11h along a dividing line of the sidewall 11d. In a state that the joining portion 11g of the first member 11e and the joining portion 11h of the second member 11f are brought into contact with each other, a cap 16 is fitted to the bottom part of the body part 11. The cap 16 has a bottom part 16a of a disk shape, and a peripheral wall 16b that is erected from the peripheral edge of the bottom part 16a. By fitting lower parts of the first member 11e and the second member 11f to the space which is surrounded by the bottom part 16a and the peripheral wall 16b, the first member 11e and the second member 11f are integrated together.

The flange portion 14 of the holder body 1 is covered with the upper plate 12. On the upper plate 12, there is formed an opening 12a of the same shape as that of the opening 11a that is formed on the body part 11. As shown in FIG. 1, the ring member 13 forms a ring shape, and has a ring portion 13a that covers the inner surface which surrounds the opening 12a of the upper plate 12, and a covering portion 13b that is spread to an outer side in a radial direction at the upper side of the ring portion 13a and covers the peripheral edge of the opening 12a of the upper plate 12. The ring member 13 is formed with protruded portions 13c that are protruded downward at a plurality of places. By inserting the protruded portions 13c into latch holes 11i that are formed at the peripheral edge of the opening 11a of the body part 11, the upper plate 12 is integrally fixed to the body part 11.

The tray 2 is accommodated in the accommodation space 11c of the holder body 1. The tray 2 has a bottom part 21 of a circular shape, a peripheral wall 22 that is extended upward at the peripheral edge of the bottom part 21 and is continuously formed in a circular shape, and pillar walls 23 that are provided at three positions in the circumferential direction of the peripheral wall 22. A beverage container is accommodated in the accommodation space 11c and is mounted on the bottom part 21 of the tray 2.

As shown in FIG. 3, the height adjuster 3 has a guide groove 11j, a lower latch recessed portion 11m (a first latch recessed portion), an upper latch recessed portion 11n (a second latch recessed portion), a movement energizing member 5, a latch energizing member 6, a lock member 7, and an operation member 8 that are provided on the holder body 1.

On the sidewall 11d of the body part 11 of the holder body 1, there are formed three guide grooves 11j that are laid out at approximately equal intervals in the circumferential direction. The guide grooves 11j are extended to a perpendicular direction along the axial direction of the body part 11 of a cylindrical shape. Both sides in the circumferential direction of each guide groove 11j are surrounded by groove side surfaces 11p of the sidewall 11d. On the groove side surface 11p at the left side (a counterclockwise direction) out of a pair of the groove side surfaces 11p that surround both the right and left sides of the guide groove 11j of the sidewall 11d, there are formed the lower latch recessed portion 11m that is formed at a lower side, and the upper latch recessed portion 11n that is formed at approximately the center in the longitudinal direction of the groove side surface 11p at an upper side than the lower latch recessed portion 11m.

The bottom part 21 of the tray 2 is laid out in the accommodation space 11c of the holder body 1. The pillar walls 23 of the tray 2 are located at outer sides in the radial direction than the guide grooves 11j that are formed on the body part 11 of the holder body 1, and cover the guide grooves 11j from the outer periphery side. Notches 16c are formed on the peripheral wall 16b of the cap 16 at the bottom part, in order to permit the lower ends of the pillar walls 23 to be located at the lower end of the body part 11 when the tray 2 is located at the lower position.

A rack 24 is extended linearly in a perpendicular direction and is formed on the side surface of one pillar wall 23 out of the three pillar walls 23 of the tray 2. A fitting hole 11q is formed near one guide groove 11j out of the three guide grooves 11j of the holder body 1. A damper device 15 is fitted and fixed to the fitting hole 11g. A pinion 15a is formed on the damper device 15. The pinion 15a is meshed with the rack 24 of the pillar wall 23. Accordingly, when the tray 2 is moved in the perpendicular direction, a linear reciprocating motion of the tray 2 is moderately buffered.

As shown in FIG. 1, between the tray 2 and the holder body 1, there is provided the movement energizing member 5 that energizes the tray 2 to an upper side in a perpendicular direction from the lower position toward the upper position. The movement energizing member 5 is a tension coil spring. A lower end of the movement energizing member 5 is latched with a latch part 25 that is formed at a lower end part of the pillar wall 23 of the tray 2, and an upper end of the movement energizing member 5 is latched with a latch part 11r that is protruded from the outer surface of the sidewall 11d of the holder body 1.

The lock member 7 and a holding member 78 are provided at a rear surface side of the bottom part 21 of the tray 2. The lock member 7 has a base portion 71 that is continuously extended to a circumferential direction along the peripheral edge of the bottom part 21 of the tray 2, and protruded portions 72 that are protruded from the base portion 71 to three positions in the circumferential direction. The lock member 7 is held between the bottom part 21 of the tray 2 and the holding member 78. The holding member 78 forms a ring shape, and is continuous along the peripheral edge of the bottom part 21 of the tray 2.

Figure 4:
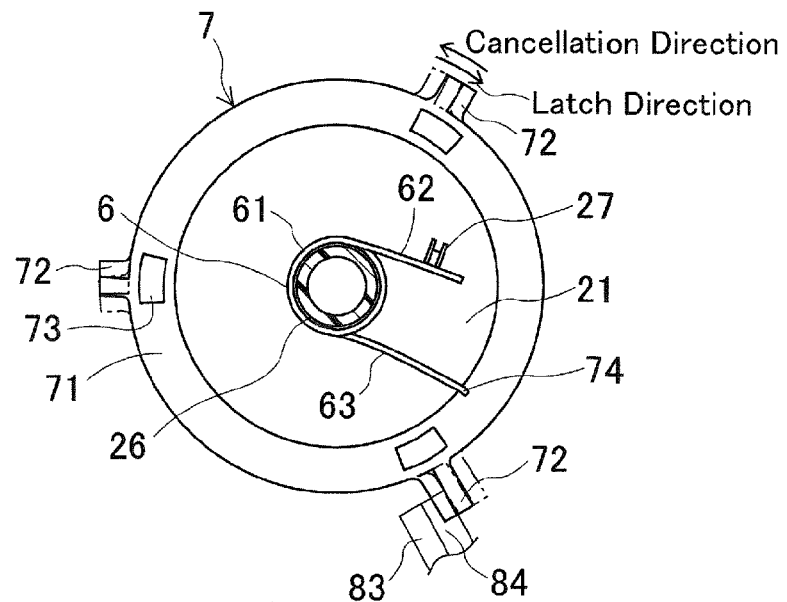
FIG. 4 is a sectional view along an arrow A-A in FIG. 1, according to the first embodiment.

The holding member 78 is formed with hole portions 78b at a few positions. The lock member 7 has opening portions 73 that is larger than the hole portions 78b and that has a play in the circumferential direction, at positions corresponding to the hole portions 78b. As shown in FIG. 4, a holding part 26 that is protruded from the center of the rear surface of the bottom part 21 of the tray 2 is fitted to the hole portion 78b of the holding member 78 by piercing through the opening portion 73, so that the lock member 7 is turnably held between the tray 2 and the holding member 78.

As shown in FIG. 4, a latch energizing member 6 is provided on the bottom part 21 of the tray 2. The latch energizing member 6 is a torsion spring, and has a winding portion 61 that is formed by winding at a few times, a first arm part 62 that is extended to one end side of the winding portion 61, and a second arm part 63 that is extended to the other end side of the winding portion 61. The winding portion 61 is externally fitted to the supporting part 26 that is protruded downward at the center part of the bottom part 21. The first arm part 62 of the latch energizing member 6 is latched with a latch part 27 that is protruded from the bottom part 21 of the tray 2, and the second arm part 63 is latched with a latch part 74 that is recessed at an upper side of the lock member 7. The latch energizing member 6 energizes the lock member 7 to the tray 2 in a clockwise direction (a latch direction) shown in FIG. 4.

As shown in FIGS. 1 and 3, the operation member 8 is a long member, and is laid out at an outer side than the body part 11 of the holder body 1. The operation member 8 has an operating part 81, a transmitting part 82 that is extended to a lower side of the operating part 81, and a working part 83 that is provided at a lower front end of the transmitting part 82. The operating part 81 is arranged to be able to advance and retreat in a hole part 14b that is formed on the flange portion 14 of the holder body 1 and in a hole part 12b that is formed on the upper plate 12. The transmitting part 82 is supported to be able to vertically movable by a supporting part 11s that is formed at an outer side of the body part 11 of the holder body 1.

Figure 5:
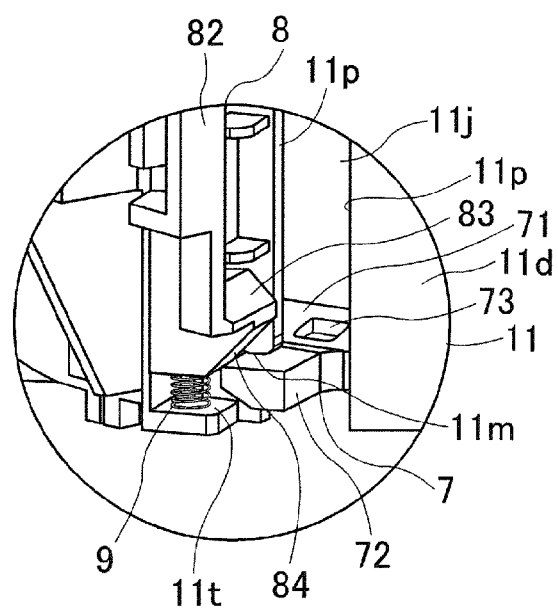
FIG. 5 is a partial perspective view showing an operation member and a lock member at a lock time, according to the first embodiment.
Figure 6:
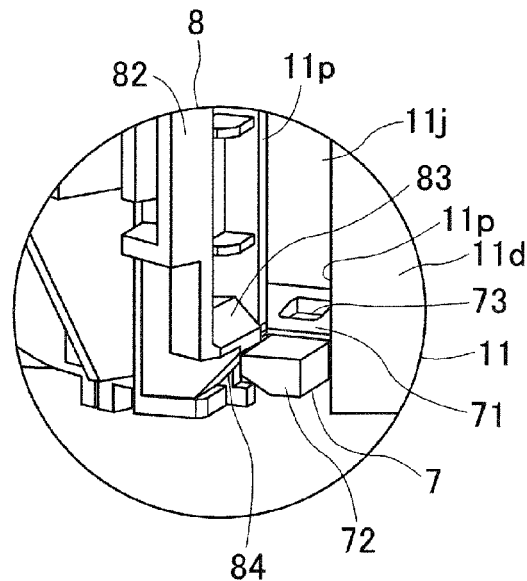
FIG. 6 is partial perspective view showing the operation member and the lock member at a lock cancel time, according to the first embodiment.

FIG. 5 is a partial perspective view showing an operation member and a lock member at a lock time. FIG. 6 is partial perspective view showing the operation member and the lock member at a lock cancel time. Both FIGS. 5 and 6 show portions around the lock member and the guide groove in a state where the tray is removed.

As shown in FIG. 5, the working part 83 of the operation member 8 is protruded to the inner side in the radial direction than the transmitting part 82, and a tapered portion 84 is formed on the side surface that faces the circumferential direction of the working part 83. The working part 83 is laid out at an outer side in the radial direction near the lower latch recessed portion 11m of the holder body 1. The tapered portion 84 that is formed on the working part 83 is inclined upwardly to the opening side from the back of the lower latch recessed portion 11m, that is, inclined to a direction of approaching the guide groove 11j. The tapered portion 84 causes the lock member 7 to be detached from the lower latch recessed portion 11m when the operation member 8 is operated by being pressed downward. A compression spring 9 is provided between the lower part of the working part 83 and a seat portion 11t that is formed on the body part 11. When the operation member 8 is pressed downward, the compression spring 9 alleviates the movement of the operation member 8 to a lower direction.

Operation of the cup holder according to the present embodiment will be described. The cup holder 10 that is shown in FIG. 1 shows a state that the tray 2 is being held at the lower position (the first position). When the tray 2 is located at the lower position, the protruded portion 72 of the lock member 7 is being latched with the lower latch recessed portion 11m of the holder body 1 by the energizing force of the latch energizing member 6 in the clockwise direction (the latch direction) in FIG. 4, and the tray 2 is being held at the lower position.

As shown FIG. 1, when the operating part 81 of the operation member 8 is pressed downward, the working part 83 of the operation member 8 is moved to the lower direction. Based on the movement of the working part 83 to the lower direction, the tapered portion 84 is brought into contact with the protruded portion 72 of the lock member 7, so that the protruded portion 72 is turned to the counterclockwise direction (the cancellation direction) in FIG. 4 and the latch state of the lower latch recessed portion 11m of the holder body 1 is canceled. The tray 2 is always energized to the upper direction by the movement energizing member 5. Based on the detachment from the lower latch recessed portion 11m of the protruded portion 72, the lock member 7 having the protruded portion 72 is moved together with the tray 2 to the upper side along the guide groove 11j, by the upward energizing force of the movement energizing member 5 that is applied to the tray 2.

Figure 7:
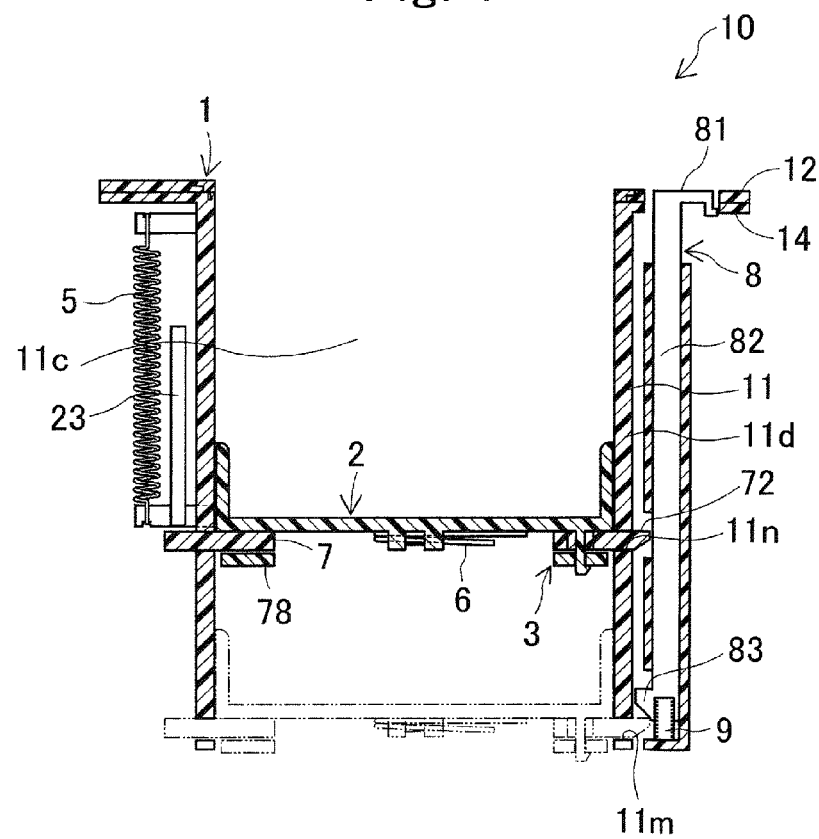
FIG. 7 is a sectional view of the cup holder when the tray is located at an upper position, according to the first embodiment.

As shown in FIG. 7, when the protruded portion 72 of the lock member 7 is located at the upper latch recessed portion 11n, the protruded portion 72 of the lock member 7 is latched with the upper latch recessed portion 11n by the energizing force of the latch energizing member 6 in the clockwise direction (the latch direction) in FIG. 4, the energizing force always being applied to the lock member 7. The tray 2 is held at the upper position (the second position).

Figure 8:
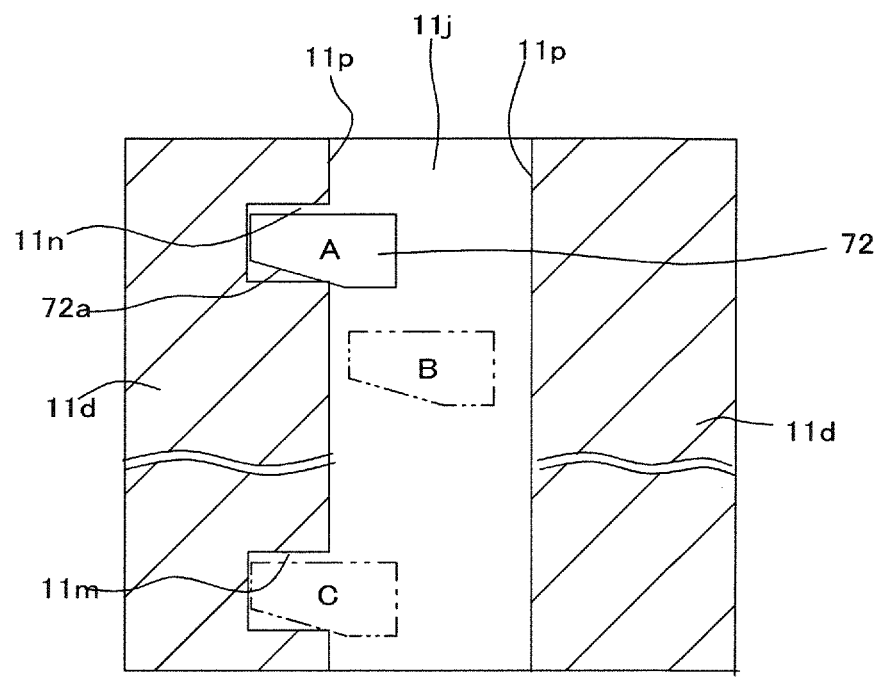
FIG. 8 is an explanatory view showing a protruded portion that is moved through guide grooves, according to the first embodiment.

As shown in FIG. 8, an inclined portion 72a is formed on the lower surface of the protruded portion 72 (A in FIG. 8) of the lock member 7. While the protruded portion 72 is being latched with the upper latch recessed portion 11n, the inclined portion 72a of the protruded portion 72 is kept in contact with the lower edge of the opening of the upper latch recessed portion 11n.

To return the tray 2 to the lower position again, the bottom part 21 of the tray 2 is pressed downward. Downward pressing load is applied to the lock member 7 that is being held on the tray 2. When the downward pressing load has exceeded the upward energizing force of the movement energizing member 5 and further the component force in the direction along the inclined portion 72a of the downward pressing load has exceeded the component force in the direction along the inclined portion 72a of the latch energizing member 6, the protruded portion 72 of the lock member 7 is moved to the right direction (the cancellation direction) in FIG. 8 along the inclined portion 72a and is detached from the upper latch recessed portion 11n. The pressing load at the time of starting the protruded portion 72 to be moved to the cancellation direction is preferably larger than the mass of the beverage container. After the protruded portion 72 is detached from the upper latch recessed portion 11n, the protruded portion 72 is moved to the lower direction along the guide groove 11j, as shown by B in FIG. 8.

When the protruded portion 72 is moved downward to the position of the lower latch recessed portion 11m in the guide groove 11j, the lock member 7 is turned to the clockwise direction (the latch direction) in FIG. 4 by the energizing force of the latch energizing member 6, and the protruded portion 72 is latched with the lower latch recessed portion 11m as shown by C in FIG. 8. As a result, the tray 2 is held at the lower position.

As described above, when the lock member 7 is turned to the cancellation direction of canceling the latch of the protruded portion 72 with the lower latch recessed portion 11m or the upper latch recessed portion 11n by the operation of the operation member 8, the tray 2 is vertically movable and can be moved to the lower position or the upper position. The height of the tray 2 can be adjusted by a simple configuration.

The operation member 8 has the tapered portion 84 that causes the lock member 7 to be moved to the cancellation direction when the operation member 8 is operated. By the operation of the operation member 8, the tapered portion 84 of the operation member 8 causes the lock member 7 to be moved to the cancellation direction, and the latch of the lock member 7 can be canceled smoothly.

The lock member 7 has the protruded portion 72 that is extended to the outer side in the radial direction. The lock member 7 holds the tray 2 at the lower position or the upper position by having the protruded portion 72 latched with the lower latch recessed portion 11m or the upper latch recessed portion 11n. The protruded portion 72 of the lock member 7 is securely latched with the lower latch recessed portion 11m or the upper latch recessed portion 11n. The tray 2 can be securely held at the lower position or the upper position.

The lock member 7 has a plurality of protruded portions 72 laid out in the circumferential direction. On the sidewall 11d of the holder body 1, there are respectively formed the guide groove 11j, the lower latch recessed portion 11m, and the upper latch recessed portion 11n at positions opposite to the protruded portion 72. The plurality of protruded portions 72 is laid out in the circumferential direction of the lock member 7. The tray 2 can be stably held on the holder body 1, by having each protruded portion 72 latched with the lower latch recessed portion 11m or the upper latch recessed portion 11n.

The damper device 15 that alleviates the moving speed of the tray 2 is provided on the holder body 1. When the latch of the lock member 7 with the lower latch recessed portion 11m is canceled, the tray 2 is raised by the movement energizing member 5. The rising speed of the tray 2 at this time is alleviated by the damper device 15, and a fall of the beverage container that is mounted on the tray 2 or a spill of the beverage can be prevented.

The operating part 81 of the operation member 8 is laid out to be able to advance and retreat in the hole part 14b that is formed on the flange portion 14 of the holder body 1. The operating part 81 can be easily operated.

Second Embodiment

Figure 9:
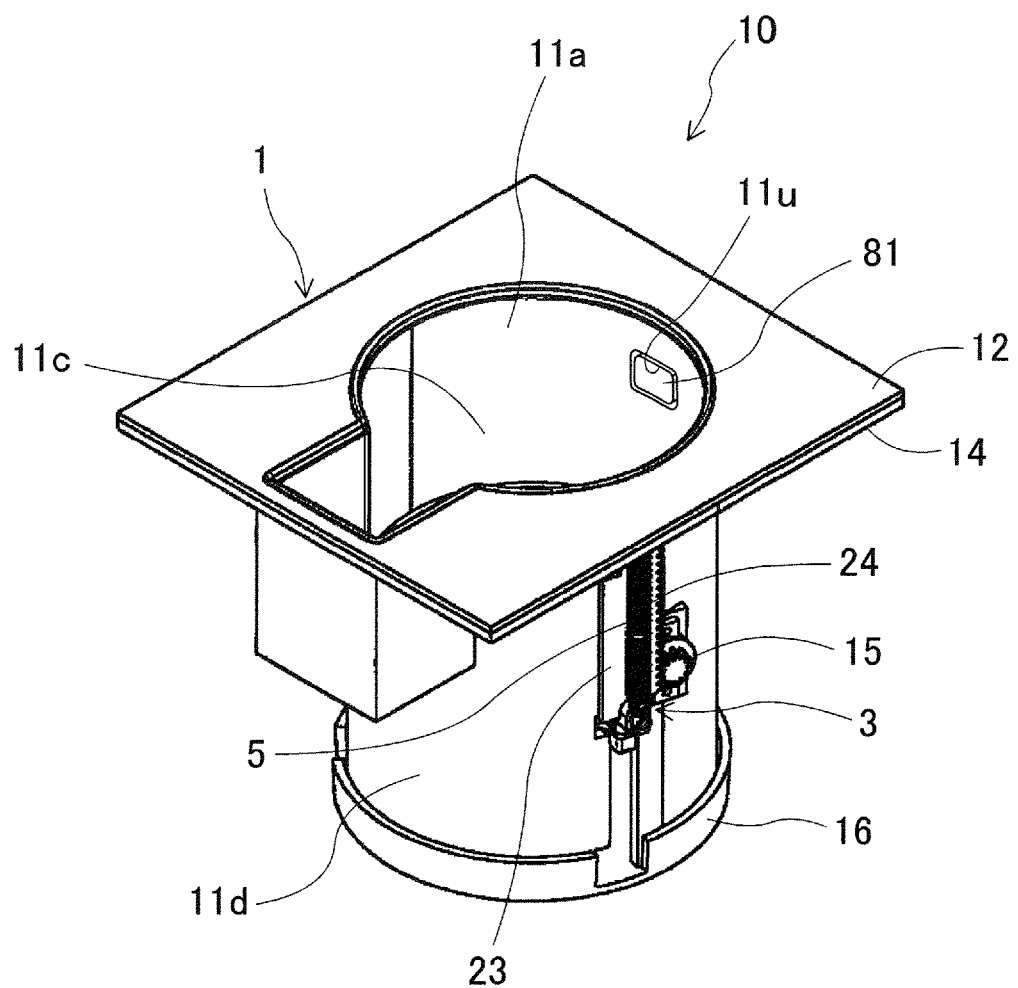
FIG. 9 is a perspective view of a cup holder, according to a second embodiment.
Figure 10:
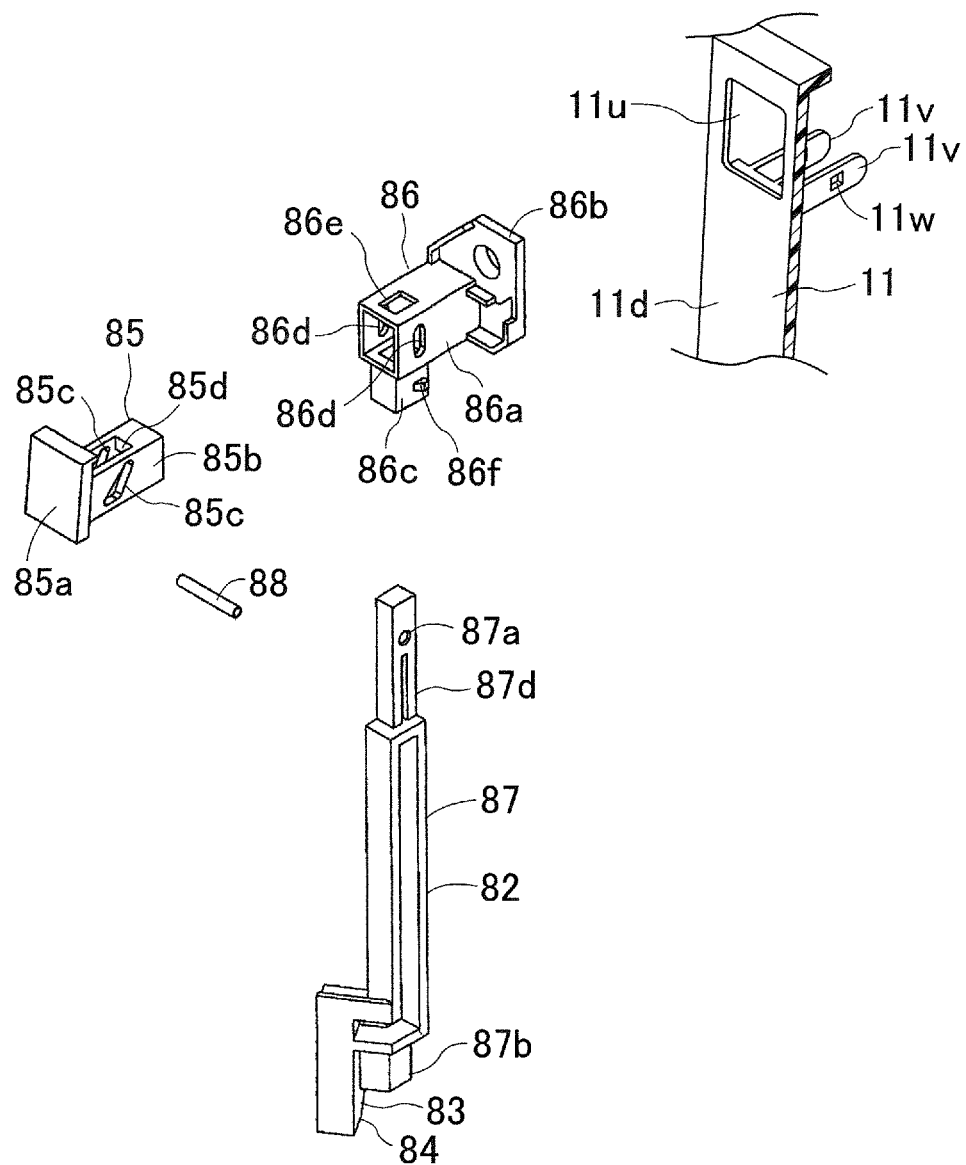
FIG. 10 is an exploded perspective view of an operation member, according to the second embodiment.

The cup holder 10 according to a second embodiment is different from the cup holder 10 according to the first embodiment in that, as shown in FIGS. 9 and 10, the operating part 81 of the operation member 8 is arranged to be able to advance and retreat in a hole part 11u that is formed on the sidewall 11d of the body part 11 of the holder body 1.

As shown in FIG. 10, the operation member 8 has an operation knob 85, an operation case 86, a supporting axis 88, and a rod member 87. The operation knob 85 has an operating part 85a, a sliding part 85b that is protruded from the operating part 85a to an outer side in the radial direction, an insertion hole 85d that is formed on the sliding part 85b and pierces through the sliding part 85b in a perpendicular direction, and play holes 85c that are formed on both side surfaces which surround the insertion hole 85d of the sliding part 85b. The operating part 85a is laid out to be able to advance and retreat in the hole part 11u that is formed on the sidewall 11d of the holder body 1. The play holes 85c are guide holes that are inclined to an upper direction toward the outer side in the radial direction. The operation case 86 has a case part 86a into which the sliding part 85b of the operation knob 85 is inserted to be able to advance and retreat, a covering portion 86b that covers the outer side in the radial direction of the case part 86a, a tube part 36c that is extended to a lower side of the case part 86a, and projections 86d that are protruded from both side surfaces of the tube part 86c. Long holes 86d that are extended to a perpendicular direction are formed on both sidewalls of the case part 86a. The rod member 87 has a long transmitting part 82, a supporting hole 87a that is formed on the upper end of the transmitting part 82, and a working part 83 that is provided at a lower side of the transmitting part 82.

The sliding part 85b of the operation knob 85 is accommodated in the case part 86a of the operation case 86. Further, a coupling part 87d having a small width at an upper side of the rod member 87 is inserted from the tube part 86c of the operation case 86 into an insertion hole 85d that is formed on the sliding part 85b which is inserted into the case part 86a. An opening portion 86e through which the upper end of the coupling part 87d is inserted to be able to advance and retreat is formed on the upper surface of the operation case 86. The supporting axis 88 is inserted into the play holes 85c of the sliding part 85b, the long holes 86d of the case part 86a, and the supporting hole 87a of the rod member 87. Snap rings not shown are fitted to both ends of the supporting axis 88 to prevent extraction. Accordingly, the operation knob 85, the operation case 86, the rod member 87, and the supporting axis 88 are integrated together to form the operation member 8. In order to hold the integrated operation member 8 in the holder body 1, the projections 86f that are protruded to the both side surfaces of the tube part 86c of the operation case 86 are fitted to stop holes 11w of a pair of supporting parts 11v which are provided immediately below the vicinity of the hole part 11u of the holder body 1.

A lower side of the transmitting part 82 of the rod member 87 forms an inverse L shape, and the working part 83 is provided at a lower front end of the lower side. The working part 83 is protruded to an inner side in the radial direction than the working part 82, and a tapered portion 84 that faces a circumferential direction is formed on the side surface of the working part 83, in a similar manner to that of the first embodiment. The working part 83 is laid out at an outer side in the radial direction near the lower latch recessed portion 11m of the holder body 1. The tapered portion 84 that is formed on the working part 83 is inclined upwardly to the opening side from the back of the lower latch recessed portion 11m, that is, inclined to a direction of approaching the guide groove 11j. The tapered portion 84 causes the lock member 7 to be detached from the lower latch recessed portion 11m when the operation member 8 is operated.

Figure 11:
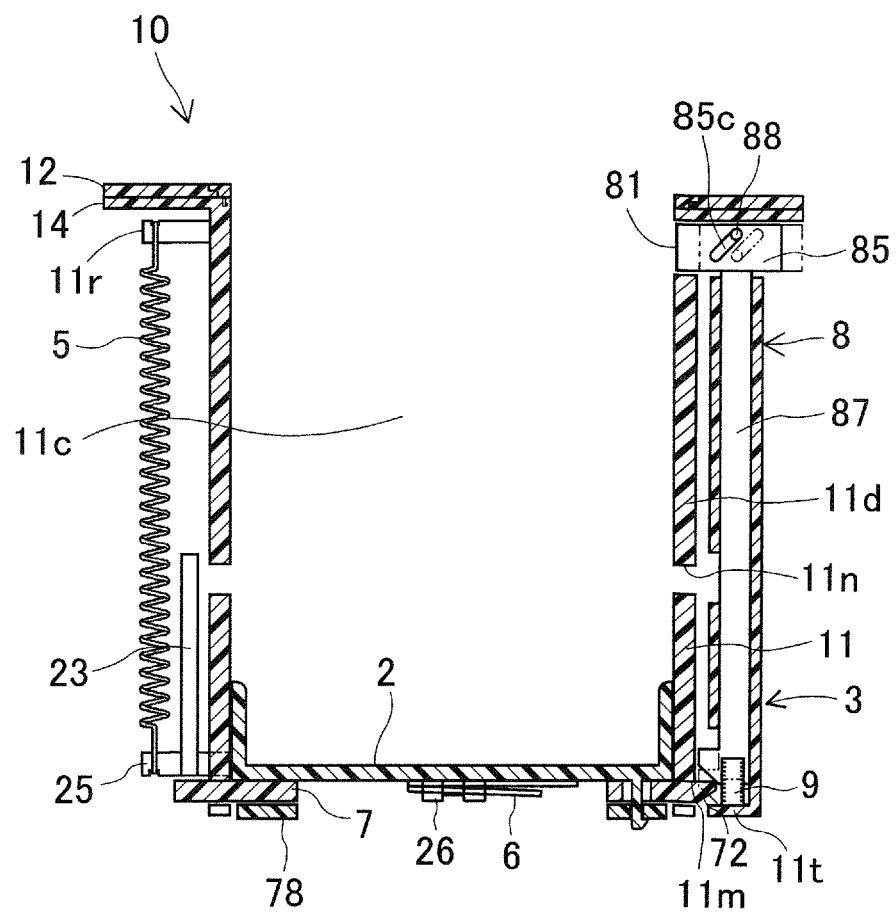
FIG. 11 is a sectional view of the cup holder when a tray is located at a lower position, according to the second embodiment.

As shown in FIGS. 10 and 11, a seat portion 87b that holds the upper end of the compression spring 9 is formed at the lower end of the transmitting part 82. The lower end of the compression spring 9 is held at the seat portion 1it that is formed at the bottom part of the holder body 1. The compression spring 9 alleviates the movement of the operation member 8 to a lower direction when the operation member 8 is pressed downward.

Configurations of the second embodiment are similar to those of the first embodiment, except the configuration of the operation member 8.

As shown in FIG. 11, when the tray 2 is located at the lower position, the protruded portion 72 of the lock member 7 is being latched with the lower latch recessed portion 11m of the holder body 1. The rod member 87 of the operation member 8 is energized to the upper side by the compression spring 9. The supporting axis 88 that is inserted in the supporting hole 87a of the rod member 87 is located at the upper ends of the long holes 86d of the operation case 86, and is also located at the upper ends of the play holes 85c of the sliding part 85b of the operation knob 85.

When the operating part 85a of the operation knob 85 is pressed to the outer side in the radial direction, the operation knob 85 is moved to the outer side in the radial direction, as shown by a two-dot chain line in FIG. 11. The upper ends of the play holes 85c that are formed on the sliding part 85b of the operation knob 85 are located at the outer side in the radial direction, and are inclined to a lower direction toward the inner side in the radial direction. When the operation knob 85 is moved to the outer side in the radial direction, the supporting axis 88 located at the upper ends of the play holes 85c slides toward the lower direction which is the inner side in the radial direction of the play holes. Accordingly, the supporting axis 88 shifts in the long holes 86d of the operation case 86 from the upper ends toward the lower ends. The rod member 87 is moved to a lower direction.

Figure 12:
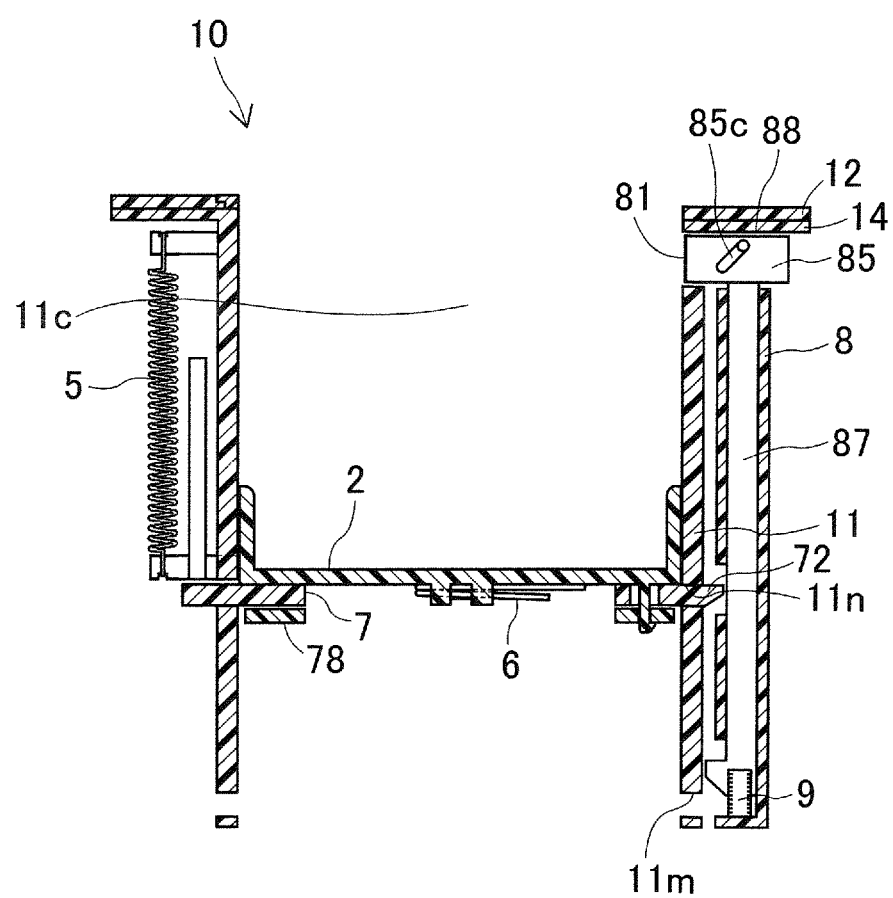
FIG. 12 is a sectional view of the cup holder when the tray is located at an upper position, according to the second embodiment.

Based on the downward movement of the working part 83, the tapered portion 84 is brought into contact with the protruded portion 72 of the lock member 7, and the latch state of the protruded portion 72 with the lower latch recessed portion 11m of the holder body 1 is canceled. The tray 2 is always energized to the upper direction by the movement energizing member 5. When the protruded portion 72 is detached from the lower latch recessed portion 11m, as shown in FIG. 12, the lock member 7 having the protruded portion 72 is moved to the upper side along the guide groove 11j, together with the tray 2, by the upward energizing force of the movement energizing member 5 that is applied to the tray 2.

The operating part 81 of the operation member 8 is laid out to be able to advance and retreat in the hole part 11u that is formed at the upper side of the sidewall 11d of the body part 11 of the holder body 1. When the beverage container is in the state of being accommodated in the accommodation space 11c, the operating part 81 is hidden by the beverage container, and it becomes difficult to operate the operating part 81. Therefore, when the beverage container is accommodated, erroneous operation of the operating part 81 does not occur and hence malfunction of the tray 2 can be prevented.

In the first and second embodiments, a tensile coil spring is used as the movement energizing member 5 that energizes the tray 2 from the lower position toward the upper position. However, other tension springs may be also used. Alternatively, a compression spring such as a compression coil spring may be used. When using the compression coil spring, it may be arranged such that the upper end of the compression coil spring is held at the seat portion that is formed at the lower end part of the pillar wall 23 of the tray 2 and that the lower end of the compression coil spring is latched with the seat portion which is protruded from the lower part of the sidewall 11d of the holder body 1.

In the first and second embodiments, in order to cancel the latch of the lock member 7 with the upper latch recessed portion 11n, the inclined portion 72a that is formed on the protruded portion 72 of the lock member 7 is latched with the opening peripheral edge of the upper latch recessed portion 11n (see FIG. 8). However, instead of this arrangement, there may be provided an operation member that cancels the latch of the lock member 7 with the upper latch recessed portion 11n by causing the lock member 7 to turn to the cancellation direction opposite to the latch direction when the tray 2 is located at the upper position. The configuration of this operation member can be similar to the configuration of the operation member 8 that cancels the latch with the lower latch recessed portion 11m of the lock member 7.

In the first and second embodiments, when the tray 2 is located at the lower position, the latch of the lock member 7 with the lower latch recessed portion 11m (the first latch recessed portion) is canceled by the operation of the operation member 8 so that the tray 2 is moved to the upper position by the upward energizing force of the movement energizing member 5. Alternatively, when the tray 2 is located at the upper position, the latch of the lock member 7 with the upper latch recessed portion 11n (the second latch recessed portion) may be canceled by the operation of the operation member 8 so that the tray 2 is moved to the lower direction by the downward energizing force of the movement energizing member 5.

Further, the lock member 7 is held by being interposed between the tray 2 and the holding member 78. However, the lock member 7 may be turnably held on the bottom part 21 of the tray 2 without using the holding member 78.

Although the latch energizing member 6 that energizes the lock member 7 to the latch direction is a torsion spring, a thin plate spring may be also used.

In the first and second embodiments, the damper device 15 is fixed to the holder body 1, and the rack 24 is formed on the pillar wall 23 of the tray 2. Alternatively, the damper device 15 may be fixed to the pillar wall 23, and the rack 24 may be formed at the outer surface side of the sidewall 11d of the holder body 1. Further, the damper device 15 may not be present. Although the pillar wall 23 is provided on the tray 2 and the guide groove 11j is covered from the outer side to prevent a small object from falling from the guide groove 11j to the outer side of the holder body 1, the pillar wall 23 may not be present.

The accommodation space 11c of the holder body 1 has one cylindrical part 11x, and a small space 11y for accommodating the knob adjacently to the cylindrical part 11x (FIG. 1). The accommodation space 11c is not limited to this configuration and may have a shape formed by only one cylindrical part 11x, or may have a shape formed by having two cylindrical parts 11x adjacently.

On the sidewall 11d of the body part 11 of the holder body 1, there may be provided in projection a supporting member to be able to advance and retreat to prevent the fall of the beverage container.

The cup holder according to the present embodiment is used as an indoor part of a vehicle. The cup holder according to the present embodiment can be also installed on a chair, furniture, and the like, without being limited to the interior part of a vehicle.

What is claimed is:

1. A cup holder having a cylindrical holder body that has an accommodation space surrounded by a sidewall that includes a hole part, a tray that is accommodated in the accommodation space and is held to be vertically movable between a first position and a second position whose perpendicular direction is different from that of the first position, and a height adjuster that causes the tray to be vertically moved and held at the first position or the second position, wherein the height adjuster comprises:
a lock member that is turnably held by the tray;
a guide groove that is formed on a sidewall of the holder body and that enables the lock member to move in a perpendicular direction;
a first latch recessed portion that is formed on a groove side surface which faces the guide groove on the sidewall of the holder body and that causes the tray to be held at the first position by latching the lock member;
a second latch recessed portion which is formed at a portion of the groove side surface of the holder body and whose position in a perpendicular direction is different from that of the first latch recessed portion and which causes the tray to be held at the second position by latching the lock member;
a latch energizing member that energizes the lock member to a latch direction for latching the lock member with the first latch recessed portion or the second latch recessed portion;
an operation member that is receivable in the hole part of the cylindrical holder body, and that cancels latch of the lock member with the first latch recessed portion by causing the lock member to turn to a cancellation direction opposite to the latch direction when the tray is located at the first position; and
a movement energizing member that energizes the tray from the first position toward the second position so as to vertically move the lock member of which latch with the first latch recessed portion has been canceled toward the second latch recessed portion through the guide groove.

2. The cup holder according to claim 1, wherein the operation member has a tapered portion that causes the lock member to turn to the cancellation direction when the operation member is operated.

3. The cup holder according to claim 1, wherein the lock member has a protruded portion that is extended to an outer side in a radial direction, and the protruded portion holds the tray at the first position or the second position by being latched with the first latch recessed portion or the second latch recessed portion.

4. The cup holder according to claim 3, wherein the lock member has a plurality of the protruded portions laid out in a circumferential direction, and on a sidewall of the holder body, the guide groove, the first latch recessed portion, and the second latch recessed portion are respectively formed at positions opposite to the protruded portions.

5. The cup holder according to claim 3, wherein the lock member has a plurality of the protruded portions laid out in a circumferential direction, and on a sidewall of the holder body, the guide groove, the first latch recessed portion, and the second latch recessed portion are respectively formed at positions opposite to the protruded portions.

6. The cup holder according to claim 1, wherein the lock member has an inclined portion that is brought into contact with an opening peripheral edge of the second latch recessed portion.

7. The cup holder according to claim 1, wherein the lock member has an inclined portion that is brought into contact with an opening peripheral edge of the second latch recessed portion.

8. A cup holder having a cylindrical holder body that has an accommodation space surrounded by a sidewall, a tray that is accommodated in the accommodation space and that is held to be vertically movable between a first position and a second position having perpendicular direction different from that of the first position, a flange portion formed at a peripheral edge of the sidewall that surrounds the accommodation space, the flange portion including a hole part, and a height adjuster that causes the tray to be vertically moved and held at the first position or the second position, wherein the height adjuster comprises:
a lock member that is turnably held by the tray;
a guide groove that is formed on a sidewall of the holder body and that enables the lock member to move in a perpendicular direction;
a first latch recessed portion that is formed on a groove side surface which faces the guide groove on the sidewall of the holder body and that causes the tray to be held at the first position when latching the lock member is latched;
a second latch recessed portion that is formed at a portion of the groove side surface of the holder body and having a position in a perpendicular direction different from that of the first latch recessed portion, and that causes the tray to be held at the second position when the lock member is latched;

a latch energizing member that energizes the lock member to a latch direction for latching the lock member with the first latch recessed portion or the second latch recessed portion;

an operation member that is receivable in the hole part located in the flange portion of the cylindrical holder body, and that cancels latch of the lock member with the first latch recessed portion by causing the lock member to turn to a cancellation direction opposite to the latch direction when the tray is located at the first position; and a movement energizing member that energizes the tray from the first position toward the second position to vertically move the lock member, from the first latch recessed portion, toward the second latch recessed portion through the guide groove.

9. The cup holder according to claim 1, wherein the operation member has a tapered portion that causes the lock member to turn to the cancellation direction when the operation member is operated.

10. The cup holder according to claim 1, wherein the lock member has a protruded portion that is extended to an outer side in a radial direction, and the protruded portion holds the tray at the first position or the second position by being latched with the first latch recessed portion or the second latch recessed portion.

* * * * *